March 19, 1963  A. KAUFMANN  3,081,978
HOSE GUIDE ASSEMBLY
Filed July 28, 1961

INVENTOR
ALFRED KAUFMANN by Wallenstein, Spigelberg & Hatton
ATTYS.

3,081,978
HOSE GUIDE ASSEMBLY
Alfred Kaufmann, 1680 Forest Ave.,
Highland Park, Ill.
Filed July 28, 1961, Ser. No. 127,646
2 Claims. (Cl. 254—190)

This invention relates to a unit for guiding a garden hose around and spacing the hose from the corner of a building, shrubbery or possible other points in the yard where the garden hose can become snagged or damaged or where the hose could damage the plant or other item against which it may be pulled.

It is, of course, impractical and unnecessary to place faucets for connecting the end of a garden hose on each side of the building so that, frequently, the hose must be pulled around corner of the building to water remote areas. Unless special precautions are taken, the hose can scrape the corner of the building or shrubbery planted adjacent thereto, making it difficult to pull the hose and sometimes damaging the hose or shrubbery.

To avoid the problem referred to, hose guides of various forms have been developed for guiding a hose around the corner of a building to keep the hose from scraping against the building or shrubbery. These hose guides, however, have left much to be desired. It is, accordingly, an object of the present invention to provide an improved hose guide for the purposes set forth above. More specifically, it is an object of the present invention to provide a hose guide which is of a more simple, rugged and economical construction than the hose guides previously made. Another object of the present invention is to provide a hose guide which can easily be rigidly anchored in the ground as by driving a part thereof into the ground by pounding with a hammer or the like and without damaging the hose guide. Still another object of the invention is to provide a hose guide which is designed to prevent slippage of the hose from the hose guide while at the same time enabling the user to easily apply the hose to or remove the hose from the hose guide.

The aforesaid said other objectives and advantages of the invention will become apparent upon making reference to the specifications and the drawings wherein.

Figure 1:
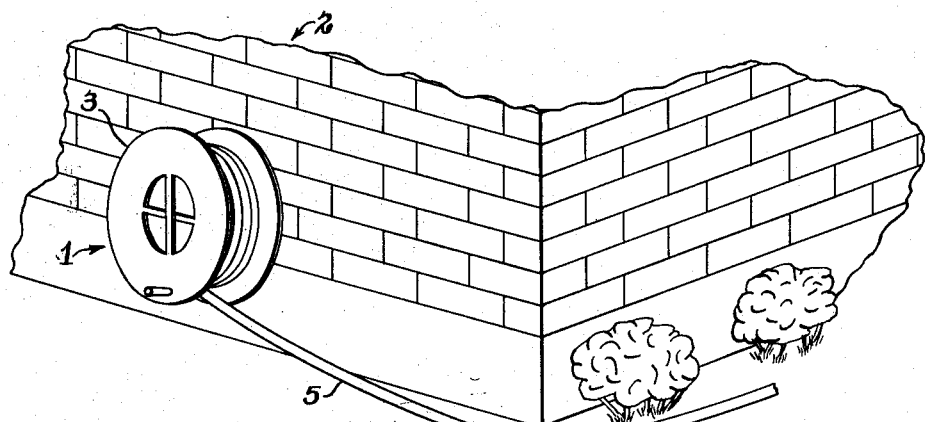
FIG. 1 is a perspective view of a corner of a building around which a hose unwinding from a hose reel unit is guided by the hose guide of the present invention.
Figure 2:
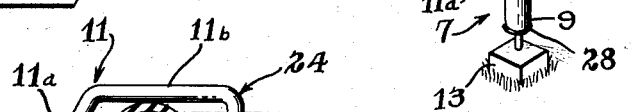
FIG. 2 is a vertical sectional view through the hose guide shown in FIG. 1.
Figure 3:
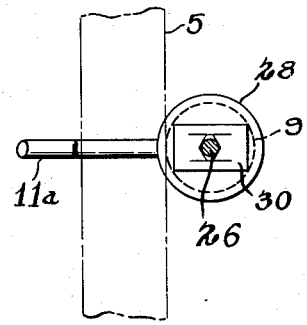
FIG. 3 is a horizontal sectional view through the hose guide of FIG. 2, taken substantially along the line 3—3 therein.
Figure 3:
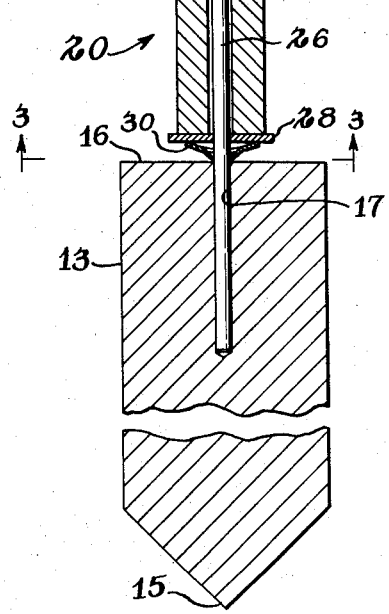

Referring now to FIG. 1 of the drawings, there is shown therein a conventional hose reel unit generally designated by reference numeral 1. This hose reel unit may be mounted upon the end of a water pipe (not shown) projecting from the wall of a building 2. The hose reel unit includes a rotatably mounted hose reel body 3 around which a garden hose 5 is wound. The inner end of the garden hose 5 is normally connected to a rotating joint (not shown) communicating with the end of the water pipe so that the hose 5 can be unwound from the hose reel unit while the water is flowing through the garden hose.

The hose 5 is shown extending around the corner of the building 2 where it is spaced therefrom and from shrubbery around the base of the building by a hose guide assembly generally indicated by reference numerals 7. The hose guide assembly 7 is anchored in the ground in a manner to be described and includes a rotatably mounted cylindrical roller 9 against which the garden hose 5 bears to minimize frictional drag as the hose is paid-out from the hose reel unit. The hose guide assembly further includes hose retainer means 11 in the form of an outwardly and downwardly extending hook portion located above the roller 9 to prevent the hose 5 from slipping off the hose guide assembly as the hose is pulled upwardly relative to the hose guide assembly. The downwardly extending end 11a of the hook-shaped hose retainer means 11 is relatively long to prevent the hose from slipping around the outside of the hose retainer 11 should some slack develop in the hose 5. The hose guide assembly is, of course, useful whether or not the hose is mounted on a hose reel unit. Frequently, the hose is not carried on any support and the end of the hose is merely connected to the end of a faucet coupling screwed to the end of a water pipe. The problem of spacing the hose from the corner of a building and shrubbery still exists.

In accordance with a specific aspect of the invention, the hose guide assembly is made in two separable parts, one of which comprises a stake 13 preferably made of wood chemically treated to withstand the moisture and other deleterious materials in the ground. The stake 13 has a pointed bottom end 15 and a wide flat top surface 16 which presents a large area for receiving the blows of a hammer for driving the stake deep into the ground with ease. A vertical bore 17 is drilled in the top of the stake, the bore 17 extending only part way therethrough.

The other part of the hose guide assembly is an integral assembly of parts generally indicated by reference numeral 20. This integral assembly of parts includes the aforementioned cylindrical roller 9, which may be made of wood or other suitable material having a longitudinal bore 22 extending therethrough. The roller is rotatably mounted around a metal rod generally indicated by reference numeral 24. The rod 24 has a straight vertical shank portion 26 sized to be force-fitted into the stake bore 17. The upper end of the shank portion 26 of the rod bends sharply outwardly to form a horizontal rod portion 11b constituting part of the aforesaid hook-shaped hose retainer means 11. The length of the horizontal rod portion is most advantageously substantially greater than the diameter of the garden hose 5. The end of the horizontal rod portion 11b terminates in a downwardly and outwardly extending rod portion to form the aforementioned end 11a of the hose retainer. The bottom of the downwardly extending retainer portion 11a is preferably spaced from the horizontal rod portion 11b a distance at least in the neighborhood of the diameter of the hose 5. The important point is that the retainer end 11a be relatively long to prevent slippage of the hose 5 around the end thereof when some slack developes in the hose.

The bottom of the roller 9 rests upon an apertured metal washer 28 extending around the rod 24. The washer 28 is held against slippage off the rod by any suitable means such as by a spring metal clip 30 fixedly anchored to the shank portion 26 of the rod 24 at a point spaced from the horizontal rod portion 11b a distance slightly greater than the length of the roller 9, so that the roller 9 is contiguous to the hose retainer means 11.

The integral roller and retainer assembly 20 is anchored to the stake 13 by manually forcing the shank portion 26 of the rod 24 into the stake bore 17. When the rod 24 is pushed to its fullest extent into the stake bore 17, the spring metal clip 30 is positioned adjacent the top of the stake. The rod 24 must, of course, be oriented so that the hose retainer means 11 faces away from the building, as illustrated in FIG. 1.

When the hose 5 is pulled upwardly relatively to the hose guide assembly, the hose 5 rides up along the roller 9 to a point where it contacts the horizontally extending retainer portion 11b of the rod. The downwardly extending retainer portion 11a is located on the outside of the hose and prevents it from slipping off the hose guide when some slack develops in the hose. Since the hose retainer does not completely encircle the hose, the latter can be easily applied to or removed from the hose guide assembly.

It is apparent that the features of the hose guide assembly just described result in an assembly which can be securely anchored deep into the ground without any damage to the roller and retainer assembly 20 because the latter assembly can be disengaged from the stake and the stake easily driven into the ground. Also the entire hose guide assembly is of extremely rugged construction, and is easy to fabricate and assemble.

It should be understood that numerous modifications may be made of the most preferred form of the invention described above without deviating from the broad aspects thereof.

I claim as my invention:

1. A hose guiding assembly comprising: a stake having a non-circular cross section and a pointed bottom end to be driven into the ground, and an assembly of parts to be anchored upon said stake, said assembly of parts comprising a vertical rod designed to be non-rotatably anchored upon and with respect to the stake, said rod having a cross sectional area substantially less than that of the stake, a hose retainer means at the top of said rod comprising a laterally extending portion terminating in a downwardly extending portion having a bottom end, and a hose engaging roller rotatably mounted around said rod, the upper end of said roller extending to a point contiguous to the laterally extending portion of said hose retainer means whereby the hose will still engage said roller when the hose contacts said laterally extending portion of said rod, the bottom end of said roller being located contiguous to the top of the stake, and the bottom end of said downwardly extending portion of said hose retainer means being spaced above the top of the stake and the entire extent of said downwardly extending portion of said hose retainer means being spaced from the side of said roller each by an amount greater than the diameter of the hose to be used therewith, whereby the hose retainer means inhibits the disconnection of the hose from the hose retainer means when the hose is pulled while permitting the hose readily to be removed laterally from the hose guiding assembly.

2. The hose guide assembly of claim 1 wherein said downwardly extending portion of said hose retainer means inclines outwardly in a downward direction for its full length.

References Cited in the file of this patent

UNITED STATES PATENTS

| | | |
|---|---|---|
| 1,968,357 | Schmiett | July 31, 1934 |
| 2,501,407 | Olsen et al. | Mar. 21, 1950 |
| 2,622,925 | Templeton | Dec. 23, 1952 |
| 2,974,933 | Belanger | Mar. 14, 1961 |